United States Patent
Weiss et al.

(10) Patent No.: US 10,202,267 B2
(45) Date of Patent: Feb. 12, 2019

(54) SYSTEMS AND METHODS FOR SENSING A LOAD CARRIED BY A MATERIAL HANDLING VEHICLE

(71) Applicant: THE RAYMOND CORPORATION, Greene, NY (US)

(72) Inventors: Joseph Andrew Weiss, Greene, NY (US); Robert Paterson, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 31 days.

(21) Appl. No.: 15/336,255

(22) Filed: Oct. 27, 2016

(65) Prior Publication Data
US 2017/0121159 A1 May 4, 2017

Related U.S. Application Data (60) Provisional application No. 62/247,976, filed on Oct. 29, 2015.

(51) Int. Cl.
| | |
|---|---|
| *B66F 9/07* | (2006.01) |
| *B66F 9/075* | (2006.01) |
| *B62B 5/00* | (2006.01) |
| *B62B 3/06* | (2006.01) |

(52) U.S. Cl.
CPC .............. *B66F 9/0755* (2013.01); *B62B 3/06* (2013.01); *B62B 5/0073* (2013.01); *B62B 5/005* (2013.01)

(58) Field of Classification Search
CPC ....... B66F 9/0755; B62B 3/06; B62B 5/0073; B62B 5/005
See application file for complete search history.

(56) References Cited

U.S. PATENT DOCUMENTS

| | | | |
|---|---|---|---|
| 3,560,678 A | 2/1971 | Richardson | |
| 4,266,106 A | 5/1981 | Freaser et al. | |
| 7,219,769 B2 | 5/2007 | Yamanouchi et al. | |
| 7,992,686 B2 | 8/2011 | McCabe | |
| 8,188,863 B2 | 5/2012 | Rinkes et al. | |
| 8,210,791 B2 | 7/2012 | Chilson et al. | |
| 2007/0215412 A1* | 9/2007 | Fossier | B66F 9/0755 187/222 |
| 2008/0011554 A1 | 1/2008 | Broesel et al. | |
| 2009/0059004 A1 | 3/2009 | Bochicchio | |
| 2010/0176922 A1 | 7/2010 | Schwab et al. | |
| 2011/0166721 A1 | 7/2011 | Castaneda et al. | |

(Continued)

FOREIGN PATENT DOCUMENTS

| | | |
|---|---|---|
| WO | 2009129295 A2 | 10/2009 |
| WO | 2011022026 A1 | 2/2011 |

OTHER PUBLICATIONS

Extended European Search Report; Appln No. 16196282.4-1760; dated Apr. 7, 2017; 6 pages.

*Primary Examiner* — Mussa A Shaawat
*Assistant Examiner* — Michael V Kerrigan
(74) *Attorney, Agent, or Firm* — Quarles & Brady LLP (57) ABSTRACT

Systems and methods for sensing the presence of a load carried by a material handling vehicle are provided. The material handling vehicle includes a vehicle body, and a load supporting member configured to support the load. The material handling vehicle further includes a load sensor configured to determine the presence of the load within a defined range of the load supporting member.

20 Claims, 8 Drawing Sheets

(56) References Cited

U.S. PATENT DOCUMENTS

2012/0126000 A1* 5/2012 Kunzig .............. G06Q 10/087
　　　　　　　　　　　　　　　　　235/385
2013/0197760 A1　　8/2013 Castaneda et al.
2013/0338885 A1　12/2013 Kirk et al.

\* cited by examiner

SYSTEMS AND METHODS FOR SENSING A LOAD CARRIED BY A MATERIAL HANDLING VEHICLE

STATEMENT OF FEDERALLY SPONSORED RESEARCH OR DEVELOPMENT

Not applicable.

BACKGROUND

The present invention relates to industrial material handling vehicles and, more specifically, to systems and methods for sensing the presence of a load carried by a material handling vehicle.

Material handling vehicles are commonly found in warehouses, factories, shipping yards, and, generally, wherever pallets, large packages, or loads of goods are required to be transported from place to place. Material handling vehicles typically include load supporting members for lifting packages or pallets for transporting, a drive motor for propelling the truck, a steering control mechanism, and a brake.

Industrial material handling vehicles have been designed to include sensing features that allow them to be an automatic guided vehicle (AGV). An AGV may be programmed to store travel routes and include a control system, which is integrated with the drive, steering, and braking systems for the vehicle. Among other reasons, sensing or locating features may be included with an AGV to detect the surrounding area, for example storage racks in a warehouse.

When a load is being engaged by the load supporting members of the AGV, there may be an indication that the pallet, or the load, is present on the load supporting members before the AGV transports the load to the desired destination. Likewise, there may also be an indication that a pallet is disengaged from the load supporting members when the load is delivered to its destination before the AGV continues operation. This may result in misinformation in a warehouse management system by reporting a pallet move that has not been completed successfully.

BRIEF SUMMARY OF THE INVENTION

The present invention provides for a material handling vehicle that includes a device which allows for sensing the presence of a load carried by the material handling vehicle.

In one aspect, the present disclosure provides a method for determining if a target load is engaged by a load supporting member of a material handling vehicle. The material handling vehicle includes a load sensor. The method includes defining a plurality of detection zones, via the load sensor, arranged sequentially along the load supporting member, calculating a predetermined minimum number of the plurality of detection zones required for the load supporting member to engage the target load for transport, and manipulating the material handling vehicle to receive the target load with the load supporting member. The method further includes determining if the target load sequentially transitions through at least two of the plurality of detection zones as the material handling vehicle receives the target load, upon determining that the target load sequentially transitions through at least two of the plurality of detection zones, determining if a number of the plurality of detections zones traversed by the target load is greater than or equal to the predetermined minimum number of the plurality of detection zones required for the load supporting member to engage the target load for transport, and upon determining that the number of the plurality of detection zones traversed by the target load is greater than or equal to the predetermined minimum number, providing an indication that the target load is engaged by the load supporting member and ready for transport.

In another aspect, the present disclosure provides a method for determining if a target load is engaged by a load supporting member of a material handling vehicle. The material handling vehicle includes a load sensor. The method includes defining a plurality of detection zones, via the load sensor, arranged along the load supporting member, manipulating the material handling vehicle to receive the target load with the load supporting member, and determining if the target load sequentially transitions through at least two of the plurality of detection zones as the material handling vehicle receives the target load. The method further includes upon determining that the target load sequentially transitions through at least two of the plurality of detection zones, determining if a number of the plurality of detections zones traversed by the target load is greater than or equal to the predetermined minimum number of the plurality of detection zones required for the load supporting member to engage the target load for transport, and upon determining that the number of the plurality of detection zones traversed by the target load is greater than or equal to the predetermined minimum number, providing an indication that the target load is engaged by the load supporting member and ready for transport.

In yet another aspect, the present disclosure provides a material handling vehicle configured to transport a target load. The material handling vehicle includes a vehicle body, a load supporting member coupled to and extending from the vehicle body, and a load sensor defining a sensing area. The sensing area includes a plurality of detection zones extending sequentially along the load supporting member. The material handling vehicle further includes a controller in communication with the load sensor and configured to determine if the target load sequentially traverses at least two of the plurality of detection zones as the target load is received by the load supporting member.

These and other features, aspects, and advantages of the present invention will become better understood upon consideration of the following detailed description, drawings and appended claims.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is also to be appreciated that material handling vehicles are designed in a variety of configurations to perform a variety of tasks. Although the material handling vehicle described herein is by example a pallet truck, it will be apparent to those of skill in the art that the present invention is not limited to vehicles of this type, and can also be provided in various other types of material handling vehicle configurations, including, for example, reach trucks, order-pickers, narrow-aisle turret trucks, and any other material handling vehicle configured to manipulate a load.

Conventionally, in material handling vehicles, a switch can be located on a load backrest such that the switch can be forced closed and activated when a load contacts the backrest, indicating that the load is fully engaged with the load supporting members. The switch can be spring loaded and open when the load is removed from the load supporting members. However, the switch can only be able to determine if the load is against the load backrest. When engaging a load, a pushed pallet may not be detected with such a device. Furthermore, when disengaging a load, the load may drag as the skid plates of the AGV attempt to move over a bottom stringer of the pallet. This can occur when the pallet is no longer in contact with the load backrest, such that the switch is unable to sense whether the load is partially in contact with the load supporting members.

Alternatively, photoelectric devices, such as a laser time of flight (ToF), can be used to measure the linear distance from the load backrest to the pallet or load along the axis of which the load supporting members travel. However, such a laser time of flight sensor can define a narrow field of view. The sensing range of a laser ToF sensor can typically be a cone or cylinder shape with a maximum diameter of 10 to 15 mm. When oriented parallel to the axis on which the load supporting members travel, it may be possible that a properly engaged load does not occupy space within the sensing range of the sensor. For example, a ToF sensor aimed toward a center stringer of a pallet may fail to sense a load that is not centered. Similarly, a ToF sensor aimed at the top board of a pallet may fail to detect a pallet that is either shorter or taller than average.

Accordingly, it would be desirable to provide a sensor for a material handling vehicle that can determine if a load properly is positioned on a load supporting member(s) of the material handling vehicle.

Figures 1A, 1B:
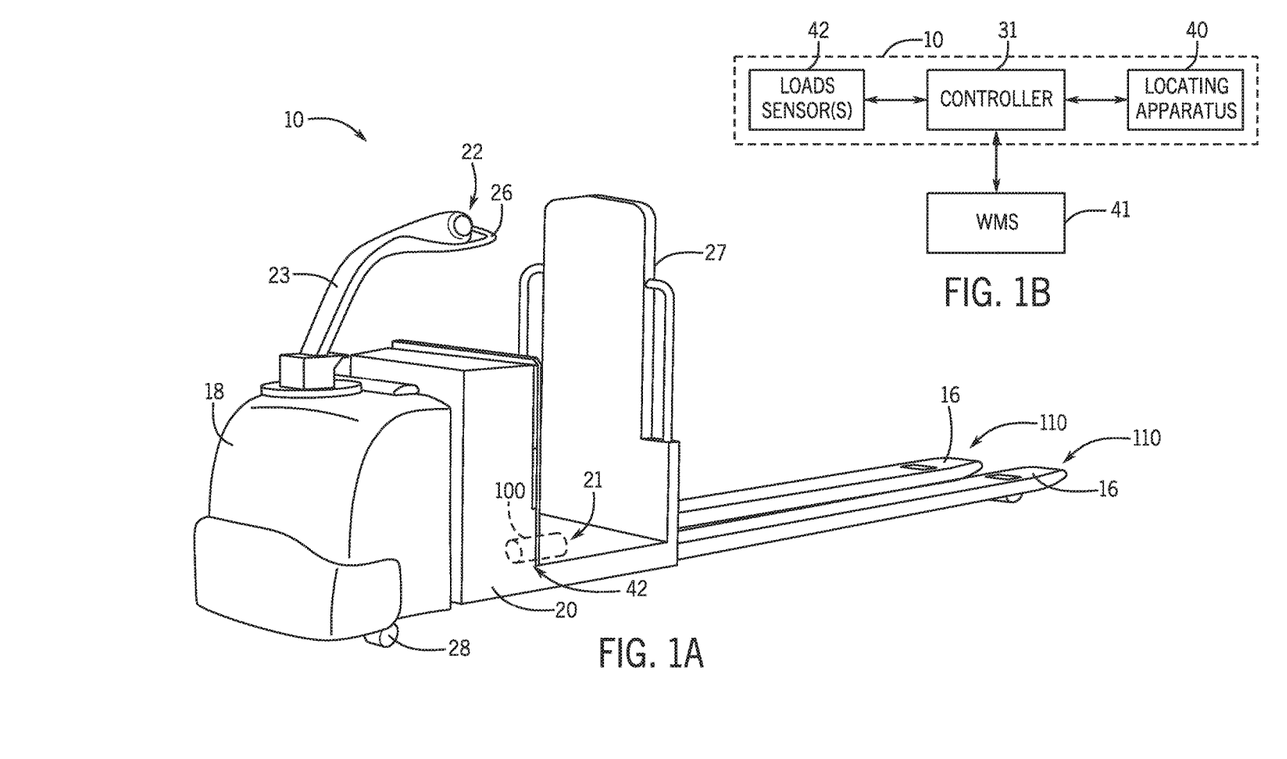
FIG. 1A is a top, front, right isometric view of a material handling vehicle having an ultrasonic sensor according to one embodiment of the present disclosure.
FIG. 1B is a schematic illustration of electrical communication on the material handling vehicle of FIG. 1A.

FIG. 1A illustrates a material handling vehicle 10 according to one embodiment of the present disclosure. The material handling vehicle 10 can include a body 12, load supporting members, for example forklift forks 16, a motor compartment 18 housing a motor (not shown), a battery compartment 20 for housing a battery (not shown), and, in some embodiments, an operator compartment 21. A wall of the operator compartment 21 can provide a load backrest 27 for stabilizing a load on the load supporting members 16. The material handling vehicle 10 can also include a steering mechanism 22. The steering mechanism 22 can be coupled to the body 12 of the material handling vehicle 10 through connection to an extension neck 23. The steering mechanism 22 can include a steering handle 26 and/or a throttle control (not shown). Manipulation of the throttle control (not shown) can send a signal via a controller 31 to control the motor (not shown) of the material handling vehicle 10. The steering mechanism 22 can be coupled to a steerable drive wheel 28.

As shown in FIG. 1B, the material handling vehicle 10 may also include the controller 31 and one or more locating apparatuses 40 that allow the material handling vehicle 10 to be an automatic guided vehicle (AGV). For example, specific types of locating apparatuses 40 include, but are not limited to, cameras, geographic positioning systems (GPS), rotating laser scanners, motion sensors, laser triangulation systems, simultaneous localization and mapping (SLAM) systems, spot navigation systems using radio-frequency identification (RFID) or magnets, and wire guidance systems. The locating apparatus 40 can provide sensing and/or navigation capabilities to automatically guide the material handling vehicle 10, however, the fact that a material handling vehicle 10 has one or more such locating apparatuses 40 does not necessarily make the material handling vehicle 10 an AGV. For example, a material handling vehicle 10 may include a GPS such that the location of that material handling vehicle 10 is known and recorded as part of a fleet management system. The controller 31 may be in communication with a warehouse management system (WMS) 41. The WMS 41 may be configured to manage operation of the material handling vehicle 10 and/or may be configured to receive data from the controller 31 to track the operational characteristics of the material handling vehicle 10.

The material handling vehicle 10 can also include one or more load sensor(s) 42 configured to determine and, in some embodiments, indicate the presence of a load carried by the material handling vehicle 10. In one embodiment, shown in FIGS. 1A and 2, the load sensor 42 can be in the form of an ultrasonic sensor 100 mounted underneath the body 12 of the material handling vehicle 10. The ultrasonic sensor 100 may be positioned between the load supporting members 16 underneath the operator compartment 21. The ultrasonic sensor 100 can define a sensing area 102 that expands as it traverses out from under the operator compartment 21 toward the load supporting members 16. In some embodiments, the sensing area 102 may define a plurality of detection zones 104, 106, and 108 sequentially arranged between the ultrasonic sensor 100 and a distal end of the sensing area 102 adjacent the ends 110 of the load supporting members 16. The illustrated sensing area 102 can define three detection zones 104, 106, and 108; however, in other embodiments, the sensing area 102 may define more or less than three detection zones, as desired. The plurality of detection zones 104, 106, and 108 may be achieved via the use of a plurality of ultrasonic sensors 100, or may be achieved via a post-processing algorithm performed on the data from the ultrasonic sensor 100.

Figure 2:
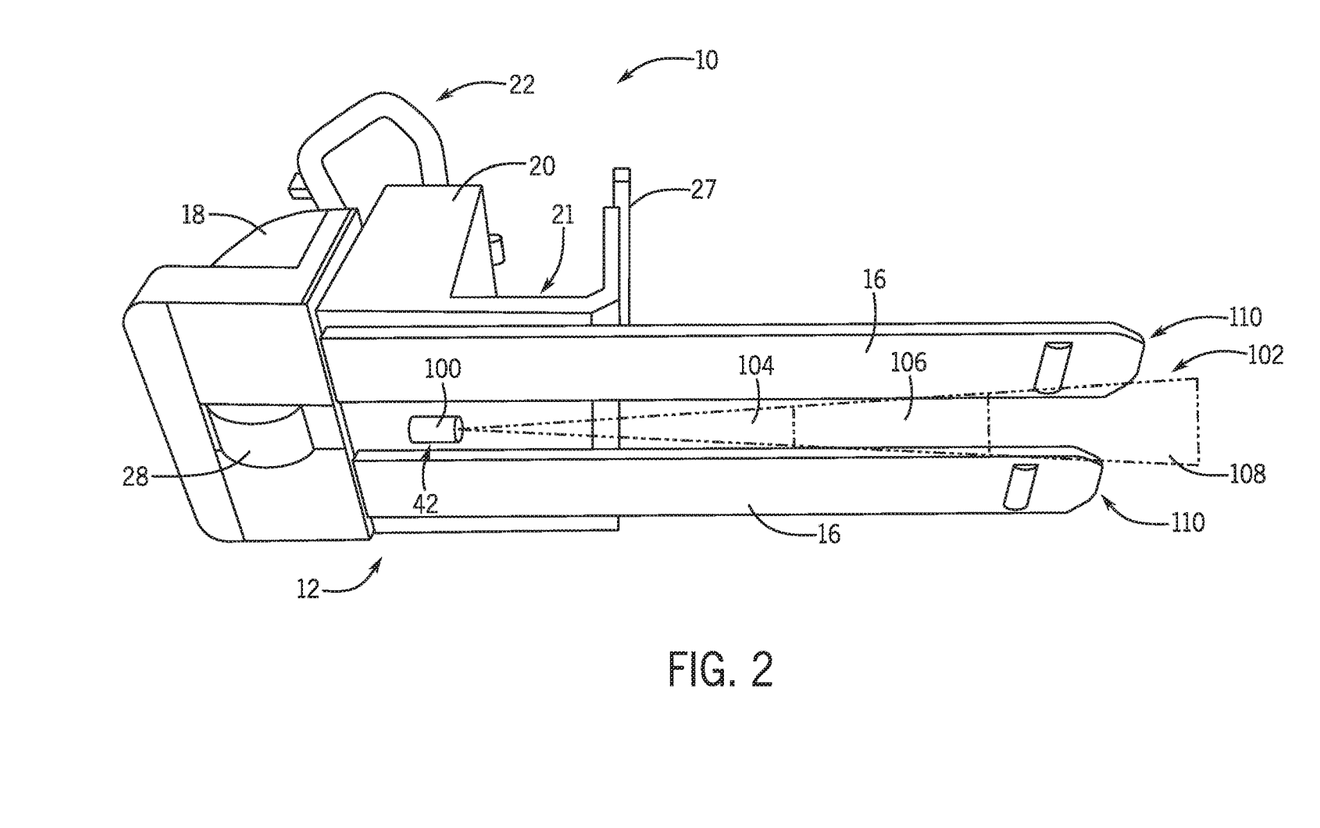
FIG. 2 is a bottom, front, right isometric view of the material handling vehicle of FIG. 1A.

In some embodiments, the ultrasonic sensor 100 may be mounted underneath the battery compartment 20 or flush with the load backrest 27. In some embodiments, a waveguide (not shown) can be mounted relative to the ultrasonic sensor 100. The waveguide (not shown) can provide a path for the ultrasonic waves from the ultrasonic sensor 100 to an area between the load supporting members 16 and may be used to increase the sensitivity of the ultrasonic sensor 100.

Figure 3:
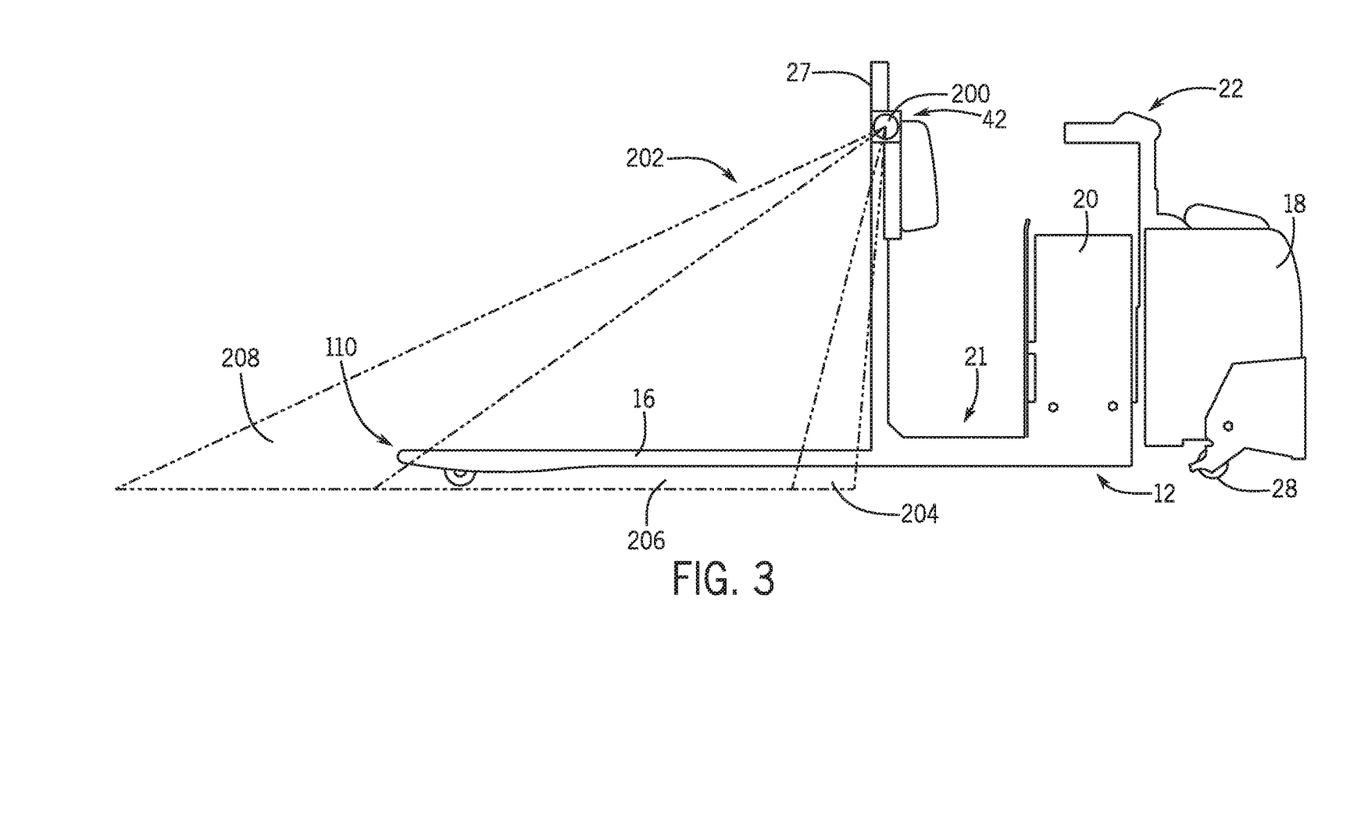
FIG. 3 is left side view of a material handling vehicle having a LIDAR scanner according to one embodiment of the present disclosure.

FIG. 3 illustrates another embodiment of the material handling vehicle 10 where the load sensor 42 can be in the form of a light detection and ranging (LIDAR) scanner 200. The LIDAR scanner 200 may be configured to define a sensing area 202, and to map features within the sensing area 202. The LIDAR scanner 200 may be positioned such that the scanned sensing area 202 is normal to the load supporting members 16 and the floor, and in the vicinity of the load supporting members 216. The illustrated LIDAR scanner 200 may be arranged on the load backrest 27 such that the sensing area 202 is directed toward the load supporting members 16. In other embodiments, the LIDAR scanner 200 may be arranged on another location on the material handling vehicle 10 such that it is able to sense the load on the load supporting members 16. The sensing area 202 defined by the LIDAR scanner 200 may include a plurality of detection zones 204, 206, and 208 sequentially arranged between the load backrest 27 and the ends 110 of the load supporting members 16. The illustrated sensing area 202 can define three detection zones 204, 206, and 208; however, in other embodiments, the sensing area 202 may define more or less than three detection zones, as desired.

Alternatively or additionally, the LIDAR scanner 200 may emit a plurality of beams within the sensing area 202. The LIDAR scanner 200 may be configured to sense a distance of each beam, and to return a data stream corresponding to the sensed distance of each individual beams. This data may be analyzed to determine a position of a pallet or load.

Figure 4:
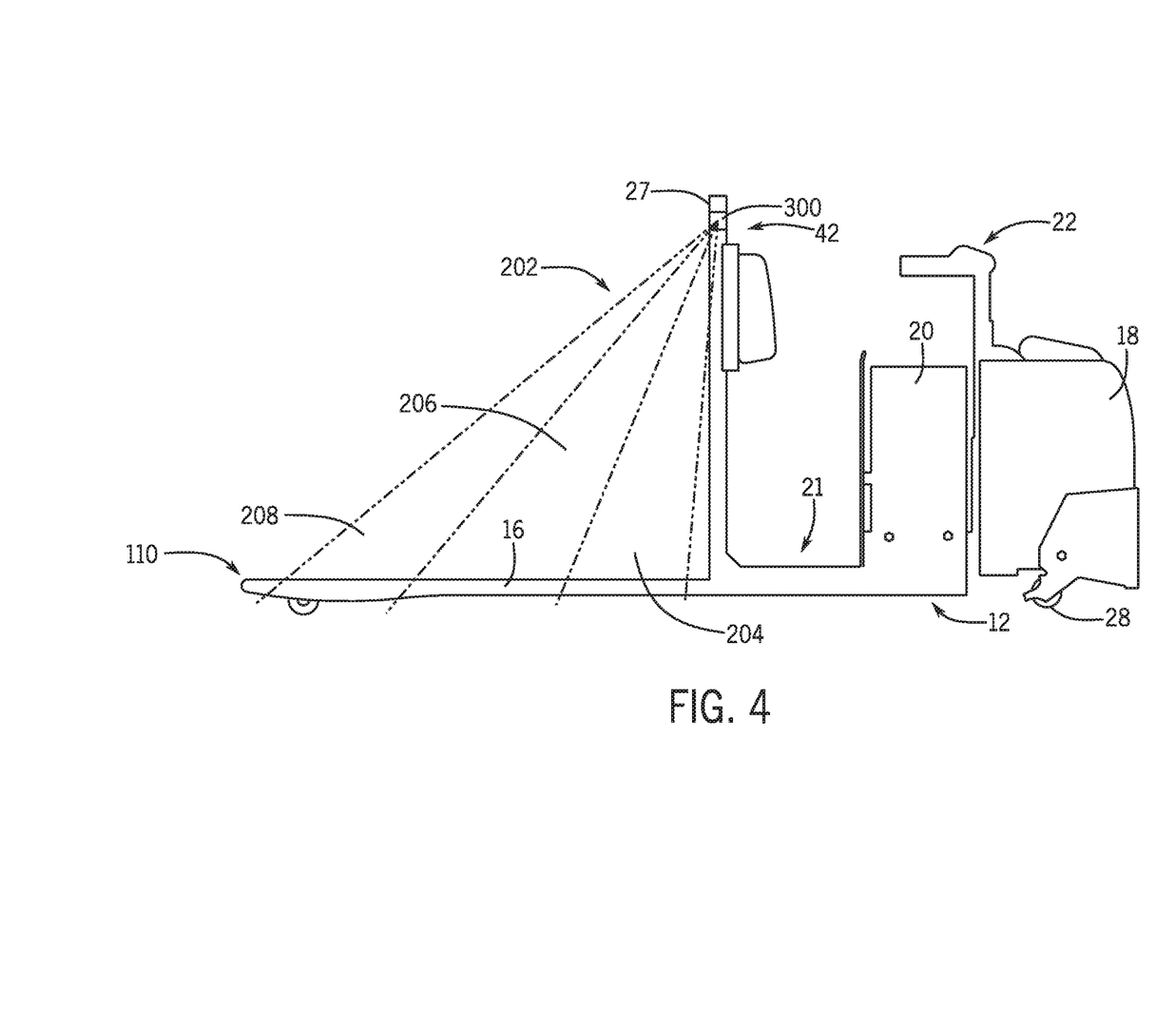
FIG. 4 is left side view of a material handling vehicle having a laser time-of-flight (ToF) sensor according to one embodiment of the present disclosure.

FIG. 4 illustrates another embodiment of the material handling vehicle 10 where the load sensor 42 can be in the form of a time-of-flight (ToF) sensor 300. The ToF sensor 300 may be mounted on the load backrest 27 such that a sensing area 302 defined by the ToF sensor 300 is directed toward the load supporting members 16. In other embodiments, the ToF sensor 300 may be arranged in an alternative location on the material handling vehicle 10 such that the scanning area 302 is directed toward the load supporting members 16.

In operation, the ToF sensor 300 may be directed at or between the load supporting members 16, such that the time-of-flight of a light signal directed from the ToF sensor 300 to an intersecting object is proportional to the distance travelled by the light signal. For example, the time-of-flight of the light signal can be known when the load supporting members 16 are empty (i.e., no load arranged thereon). It follows that the time-of-flight light signal can decrease in time when a load is present on the load supporting members 16. In this way, the ToF sensor 300 can be used to define one or more zones, which correspond with a given ToF signal, to track a load as it is loaded on the load supporting members 16 and/or unloaded off the load supporting members 16. In some embodiments, the ToF sensor 300 may be configured to detect the top boards of a pallet, or a load that is present on top of a pallet or the load supporting members 16. Orienting the ToF sensor 300 above a load may improve the reliability with which the ToF sensor 300 detects a pallet or load. Alternatively or additionally, one or more ToF sensors 300 may be used to sense a load along the length of the load supporting members 16 in order to provide load position data in addition to load presence sensing. That is, each of the ToF sensors 300 may define a zone to detect the presence of a load and track the relative position of the load as it travels along the load supporting members 16.

Figure 5:
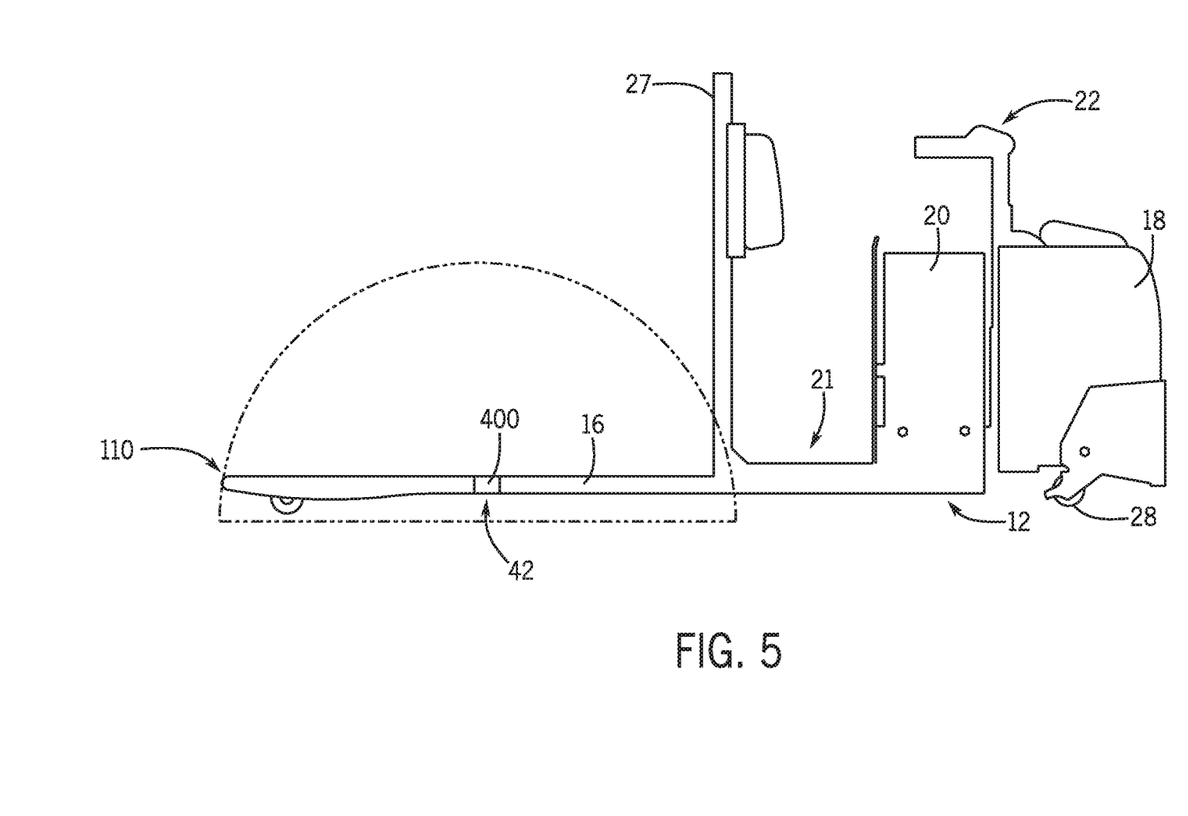
FIG. 5 is a left side view of a material handling vehicle having a radiofrequency identification (RFID) reader according to one embodiment of the present disclosure.

FIG. 5 illustrates another embodiment of the material handling vehicle 10 where the load sensor 42 can be in the form of one or more radio frequency identification (RFID) reader(s) 400. The RFID reader(s) 400 may be arranged on the material handling vehicle 10, for example on the load supporting members 16 or the load backrest 27, such that the sensing range covers an area surrounding the load supporting members 16. The RFID reader 400 can be configured to indicate the presence of an RFID tag within the sensing range of the RFID reader 400. When a pallet or load having a RFID tag is detected within the sensing range of the RFID reader 400, the RFID reader 400 may be configured to indicate that the load is present. Alternatively, the absence of an RFID tag within the sensing range of the RFID reader 400 can indicate that a load is not present.

Figure 6:
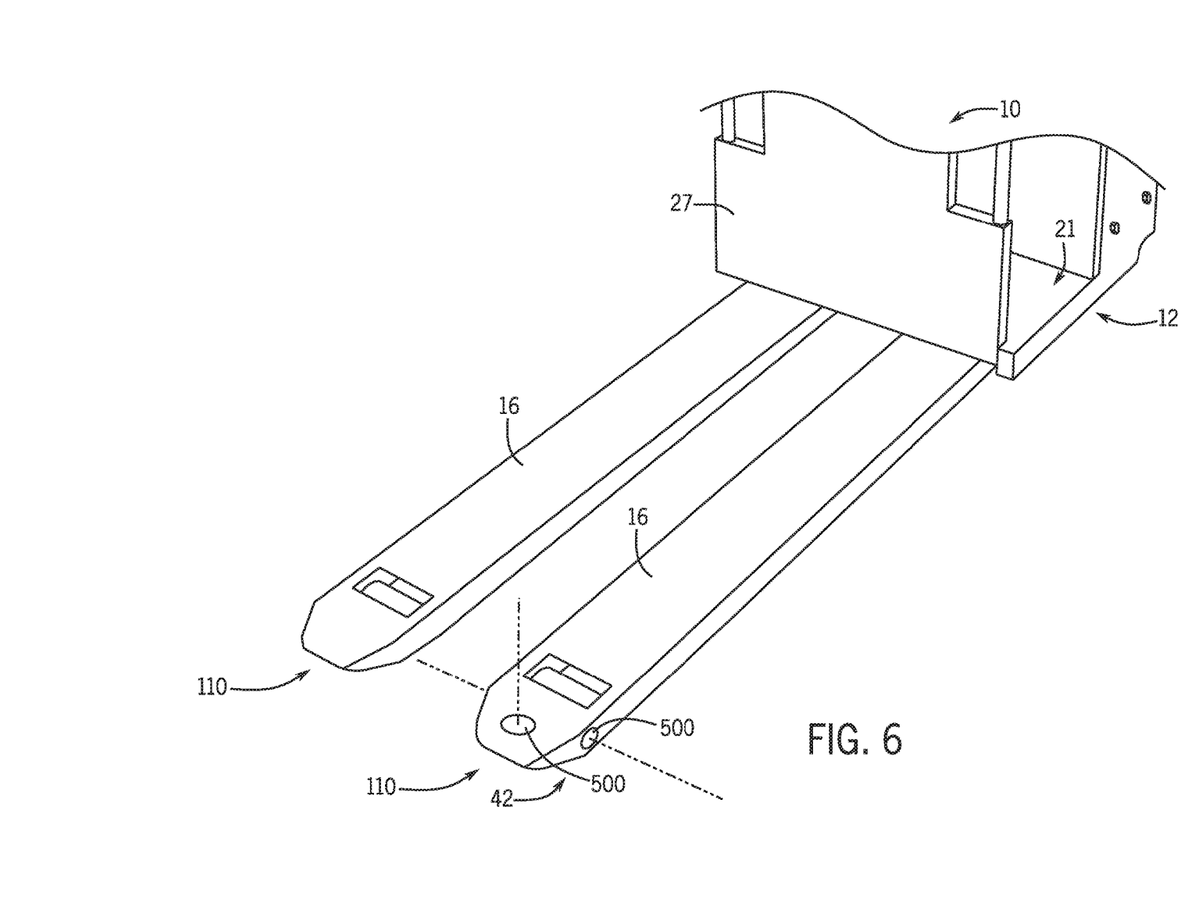
FIG. 6 is a partial top, back, left isometric view of a material handling vehicle having a photoelectric sensor arranged adjacent to a fork tip according to one embodiment of the present disclosure.

FIG. 6 illustrates another embodiment of the material handling vehicle 10 where the load sensor 42 can be in the form of a photoelectric sensor 500. The photoelectric sensor 500 can be arranged on one of the load supporting members 16 adjacent to the end 110 thereof. The photoelectric sensor 500 can be configured to sense objects in the range of the photoelectric sensor 500. The photoelectric sensor 500 can be configured to sense objects within a 200 to 300 mm range, or 100 to 400 mm, or 50 to 500 mm as non-limiting examples. As illustrated in FIG. 5, the photoelectric sensor 500 may be arranged in a plurality of directional orientations. For example, in one embodiment, the photoelectric sensor 500 may be horizontally directed toward the outside of the load supporting members 16. In another embodiment, the photoelectric sensor 500 may be horizontally directed between the load supporting members 16 to sense the presence of a pallet. In either of the horizontally oriented embodiments, the photoelectric sensor 500 may be configured to detect a vertically oriented portion of a pallet or load. In yet another embodiment, the photoelectric sensor 500 may be vertically directed perpendicularly to the load supporting member 16 (i.e., oriented to detect in a range normal to a top surface of the load supporting member 16 on which the photoelectric sensor 500 is arranged). In this embodiment, the photoelectric sensor 500 may be configured to detect a horizontally oriented portion of a pallet or load. It should be appreciated that, in some embodiments, the material handling vehicle 10 may include one or more photoelectric sensors 500 directed to detect in any of the horizontal or vertical directions described above. Alternatively or additionally, the material handling vehicle 10 may include a photoelectric sensor 500, or a group of photoelectric sensors 500 with different orientations, arranged on each of the load supporting members 16 at a similar location along the length of the load supporting members 16.

Figure 7:
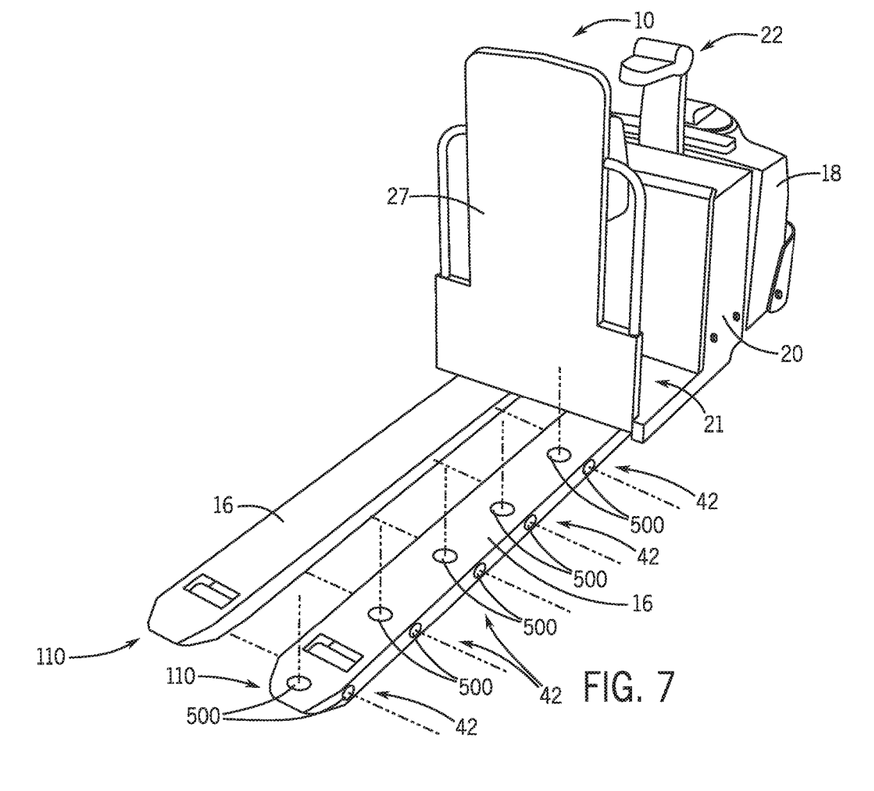
FIG. 7 is a top, back, left isometric view of a material handling vehicle having a plurality of photoelectric sensors arranged along a fork according to one embodiment of the present disclosure.

A plurality of photoelectric sensors 500 may be arranged in an array along one, or both, of the load supporting members 16 to define specific zones along the load supporting members 16, as shown in FIG. 7. The use of a plurality of photoelectric sensors 500 to define specific zones may enable a position of a load arranged on the load supporting member 16 to be defined with respect to which of the specific zones are activated. In addition, a sequence in which the specific zones of photoelectric sensors 500 are activated may enable the difference between a properly loaded pallet and potential noise to be distinguished between. For example, if a linearly arranged, or spaced, photoelectric sensors 500 can be used to define the specific zones, it may be expected for individual photoelectric sensors 500 within individual zones to activate sequentially from the ends 110 to the load backrest 27 along the load supporting member 16. Conversely, during an unloading event, it may be expected that the photoelectric sensors 500 within individual zones will deactivate in the reverse order. If one photoelectric sensor 500, or one zone of photoelectric sensors 500, activates, with none of the other photoelectric sensors 500 in the other zones activating, this may be detected and disregarded as noise. This type of false reading may not be detectable with a single photoelectric sensor 500, or one zone of photoelectric sensors 500.

In an embodiment where both of the load supporting members 16 include an array of photoelectric sensors 500 to define specific zones along the load supporting members 16, the number of zones and the order in which the zones are activated may be utilized to detect if a load arranged on the load supporting members 16 is askew. For example, if the number of specific zones that are activated (i.e., the photoelectric sensor(s) 500 within the zone are indicating the presence of an object) on one of the load supporting members 16 does not equal the number of specific zones activated on the other load supporting member 16, this may be an indication that the load on the load supporting members 16 is not properly loaded or arranged askew. Alternatively or additionally, if the same number of zones are activated but the zones that are activated to not correspond with one another (e.g., the first two zones adjacent to the end 110 of one load supporting member 16 and the last two zones adjacent to the load backrest 27 of the other load supporting member 16), this may be an indication that the load was not properly loaded or arranged askew.

Figure 8:
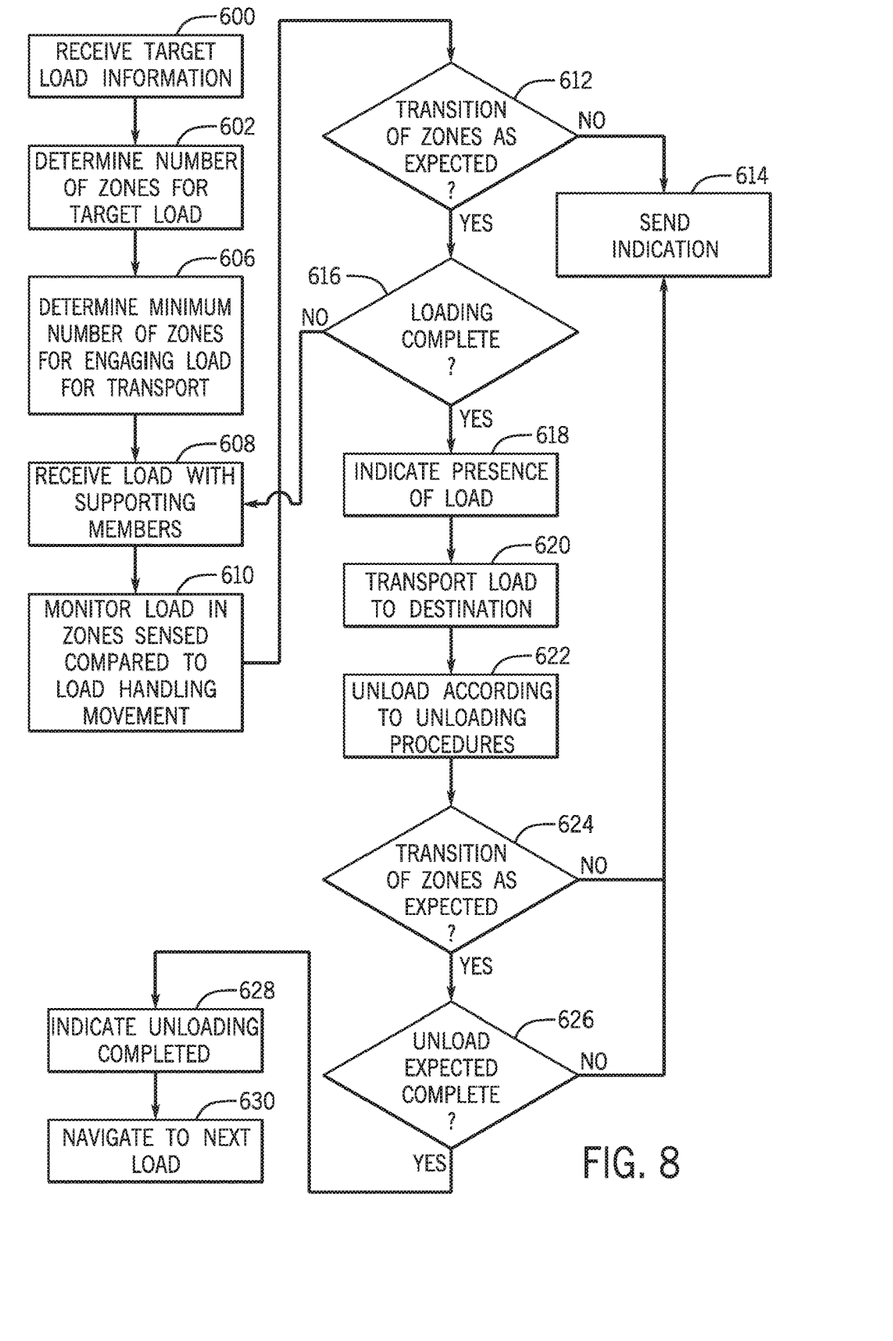
FIG. 8 is a flowchart illustrating steps for sensing a load carried by a material handling vehicle according to the present disclosure.

Operation of the material handling vehicle when detecting the presence of or tracking the position of a load will be described below with reference to FIGS. 1A-8. As shown in FIG. 8, during operation of the material handling vehicle 10, the controller 31 can receive target load information at step 600 for a target load to be handled and/or transported by the material handling vehicle 10. The target load information received by the controller 31 at step 600 may be communicated, for example, from the WMS 41. Alternatively or additionally, the target load information may be stored on or accessible by the controller 31. The target load information can comprise, for example a size of the target load, a location of the target load, a destination for the target load, etc. Once the target load information is received at step 600, the number of zones that the target load can occupy can be determined at step 602. For example, a known size of the target load can be communicated to the controller 31 at step 600 and, based on this known size, a number of zones, defined by the load sensor(s) 42, that the target load can occupy can be calculated at step 602. Depending on the details of the vehicle and load, additional checks may be made at this step. For example, if the vehicle forks are long enough to handle two loads simultaneously and only a single load needs to be moved the vehicle may carry the load in one of two positions. The vehicle may engage the load so that it is in contact with the load backrest for increased stability during transport if the sensors toward the fork tips are shown to be clear, indicating that only a single load was picked up. Alternatively, if the sensors near the fork tips indicate a second load is present on the forks the single intended load to be move may be carried in the position toward the tips of the forks.

A minimum number of active zones for fully engaging the target load for transport can be determined at step 606. In some embodiments, the number of zones for transport may be equal to the number of zones calculated at step 602. In other embodiments, the number of zone for transport may be less than the number of zones calculated at step 602 (e.g., the load may not be loaded all the way to the load backrest 27 but may still be sufficiently supported by the load supporting members 16 for transport). Once the minimum number of zones for engaging the load for transport are determined at step 606, the material handling vehicle 10 can maneuver to receive the target load on the load supporting members 16. As the material handling vehicle 10 is maneuvered to receive the target load at step 608, the zones sensed, or activated, can be monitored and compared to the movement of the material handling vehicle 10 at step 610. In some embodiments, a speed of the material handling vehicle 10 may be known as the material handling vehicle receives the target load at step 608. This speed may be used to determine when certain zones may be activated during the loading process. In this way, the progress and position of the target load as it is received by the load supporting members 16 can be monitored and communicated to the controller 31 and/or the WMS 41.

In addition to monitoring the zones sensed during the loading process at step 610, it can be determined at step 612 if the target load transitions sequentially through the zones as expected. As described above, a plurality of zones may be defined by the various configurations of the load sensor 42. The plurality of zones may be sequentially defined from the ends 110 of the load supporting members 16 to the load backrest 27. Thus, during the loading of the target load, it can be determined at step 612 if the target load sequentially activates the zones starting at the ends 110 of the load supporting members 16 and moving toward the load backrest 27. For example, at step 612 it may be determined if the target load sequentially traverses at least two of the plurality of zones. In other embodiments, it may be determined if the target load sequentially traverses more than at least two of the plurality of zones. If it is determined at step 612 that the target load did not sequentially traverse the zones as expected, an indication of this can be provided to an operations of the material handling vehicle 10 and/or to the WMS 41 at step 614. If it is determined at step 612 that the target load did sequentially traverse the zones as expected, it can then be determined at step 616 if the loading of the target load is complete. In some embodiments, the loading can be completed when the minimum number of zones for fully engaging the load for transport, calculated at step 606, are sensed, or activated. If it is determined at step 616 that the loading is not complete, the material handling vehicle 10 can continue to be maneuvered to receive the target load until the conditions of steps 612 and 616 are satisfied. If it is determined at step 616 that the loading is completed (i.e., the target load can be properly engaged on the load supporting members 16 and ready for transport), an indication of this can be provided to an operator of the material handling vehicle and/or to the WMS 41 at step 618.

Once the indication of the load presence is provided at step 618, the material handling vehicle 10 can transport the target load to its predetermined destination at step 620. When the target load reaches its predetermined destination, the target load can be unloaded according to unloading procedures at step 622. During the unloading process at step 622, it can be determined at step 624 if the target load transitions through the zones as expected. For example, it can be determined if the zones deactivate in a direction from the load backrest 27 to the ends 110 of the load supporting members 16. If it is determined at step 624 that the target load does not transition through the zones as expected, an indication of this can be provided to an operator of the material handling vehicle 10 and/or to the WMS 41 at step 614. If it is determined at step 624 that the target load does transition through the zones as expected, it can be determined at step 626 if the unloading is complete. In some embodiments, the unloading process may be indicated as completed when each of the previously activated zones are deactivated. This may provide an indication that the load supporting members 16 no longer engage the target load, which can indicate a successful unloading. If it is determined at step 626 that the unloading process does not complete, an indication of this can be provided to an operator of the material handling vehicle 10 and/or to the WMS 41 at step 614. If it is determined at step 626 that the unloading of the target load successfully completed, an indication of this can provided to an operator of the material handling vehicle 10 and/or to the WMS 41 at step 628, and the material handling vehicle 10 can navigate to the next target load at step 630.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not be limited by the above disclosure.

We claim:

1. A method for determining if a target load is engaged by a load supporting member of a material handling vehicle, the material handling vehicle including a load sensor, the method comprising:

defining a plurality of detection zones, via the load sensor, arranged sequentially along the load supporting member;

calculating a predetermined minimum number of the plurality of detection zones required for the load supporting member to engage the target load for transport;

manipulating the material handling vehicle to receive the target load with the load supporting member;

determining if the target load sequentially transitions through at least two of the plurality of detection zones as the material handling vehicle receives the target load;

upon determining that the target load sequentially transitions through at least two of the plurality of detection zones, determining if a number of the plurality of detections zones traversed by the target load is greater than or equal to the predetermined minimum number of the plurality of detection zones required for the load supporting member to engage the target load for transport; and upon determining that the number of the plurality of detection zones traversed by the target load is greater than or equal to the predetermined minimum number, providing an indication that the target load is engaged by the load supporting member and ready for transport.

2. The method of claim 1, further comprising:

monitoring the plurality of detection zones traversed by the target load; and correlating the traversed detection zones to a speed of the material handling vehicle.

3. The method of claim 1, further comprising:

determining if the target load does not sequentially transition through at least two of the plurality of detection zones; and upon determining that the target load does not sequentially transition through at least two of the plurality of detection zones, providing an indication that loading of the target load was unsuccessful.

4. The method of claim 1, further comprising:

manipulating the material handling vehicle to unload the target load from the load supporting member;

determining if at least two of the plurality of detection zones are sequentially deactivated as the material handling vehicle unloads the target load;

upon determining that at least two of the plurality of detection zones are sequentially deactivated as the material handling vehicle unloads the target load, determining if a number of the plurality of detection zones deactivated is equal to the number of the plurality of detection zones traversed by the target load as the target load was received by the load supporting member; and upon determining that the number of the plurality of detection zones deactivated is equal to the number of the plurality of detection zones traversed, providing an indication that the target load is disengaged from the load supporting member.

5. The method of claim 4, further comprising:

determining if at least two of the plurality of detection zones do not sequentially deactivate as the material handling vehicle unloads the target load; and upon determining that at least two of the plurality of detection zones do not sequentially deactivate, providing an indication that the unloading of the target load was unsuccessful.

6. The method of claim 4, further comprising:
 determining if the number of the plurality of detection zones deactivated is not equal to the number of the plurality of detection zones traversed; and
 upon determining that the number of the plurality of detection zones deactivated is not equal to the number of the plurality of detection zones traversed, providing an indication that the unloading is not complete.

7. A method for determining if a target load is engaged by a load supporting member of a material handling vehicle, the material handling vehicle including a load sensor, the method comprising:
 defining a plurality of detection zones, via the load sensor, arranged along the load supporting member;
 manipulating the material handling vehicle to receive the target load with the load supporting member;
 determining if the target load sequentially transitions through at least two of the plurality of detection zones as the material handling vehicle receives the target load;
 upon determining that the target load sequentially transitions through at least two of the plurality of detection zones, determining if a number of the plurality of detections zones traversed by the target load is greater than or equal to a predetermined minimum number of the plurality of detection zones required for the load supporting member to engage the target load for transport; and
 upon determining that the number of the plurality of detection zones traversed by the target load is greater than or equal to the predetermined minimum number, providing an indication that the target load is engaged by the load supporting member and ready for transport.

8. A material handling vehicle configured to transport a target load, the material handling vehicle comprising:
 a vehicle body;
 a load supporting member coupled to and extending from the vehicle body;
 a load sensor defining a sensing area, wherein the sensing area includes a plurality of detection zones extending sequentially along the load supporting member; and
 a controller in communication with the load sensor and configured to determine if the target load sequentially traverses at least two of the plurality of detection zones as the target load is received by the load supporting member, and provide an indication that the target load is engaged by the load supporting member and ready for transport.

9. The material handling vehicle of claim 8, wherein the controller is further configured to monitor a number of the plurality of detection zones traversed by the target load as the target load is received by the load supporting member.

10. The material handling vehicle of claim 9, wherein when the number of the plurality of detection zones traversed by the target load is greater than or equal to a predetermined minimum number required for transport, the controller is configured to provide an indication that the target load is engaged by the load supporting member and ready for transport.

11. The material handling vehicle of claim 10, wherein the controller is in communication with a warehouse management system and is configured to provide the indication to the warehouse management system.

12. The material handling vehicle of claim 8, further comprising a second load supporting member.

13. The material handling vehicle of claim 12, wherein the load sensor comprises an ultrasonic sensor arranged between the load supporting member and the second load supporting member.

14. The material handling vehicle of claim 8, wherein the load sensor comprises a light detection and ranging scanner.

15. The material handling vehicle of claim 14, wherein the light detection and ranging scanner is arranged on a backrest of the material handling vehicle and directed toward the load supporting member.

16. The material handling vehicle of claim 8, wherein the load sensor comprises a time-of-flight sensor.

17. The material handling vehicle of claim 16, wherein the time-of-flight sensor is arranged on a backrest of the material handling vehicle and directed toward the load supporting member.

18. The material handling vehicle of claim 8, wherein the load sensor comprises an array of photoelectric sensors arranged along the load supporting member.

19. The material handling vehicle of claim 18, wherein the photoelectric sensors are arranged in a horizontal direction parallel to a floor on which the material handling vehicle travels.

20. The material handling vehicle of claim 18, wherein the photoelectric sensors are arranged in a vertical direction normal to a top surface of the load supporting member.

* * * * *